June 18, 1968  R. T. SULLIVAN  3,388,645
PHOTOGRAPHIC DEVICE
Filed Dec. 30, 1965  2 Sheets-Sheet 1
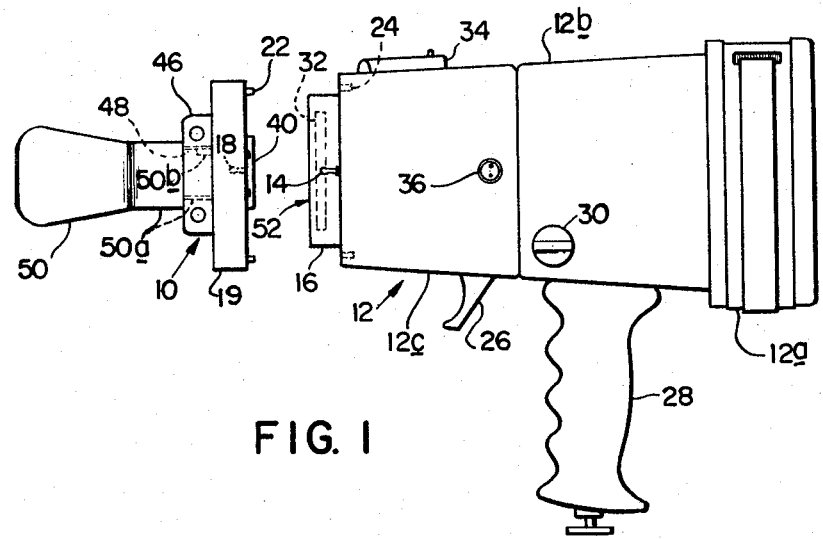
FIG. 1
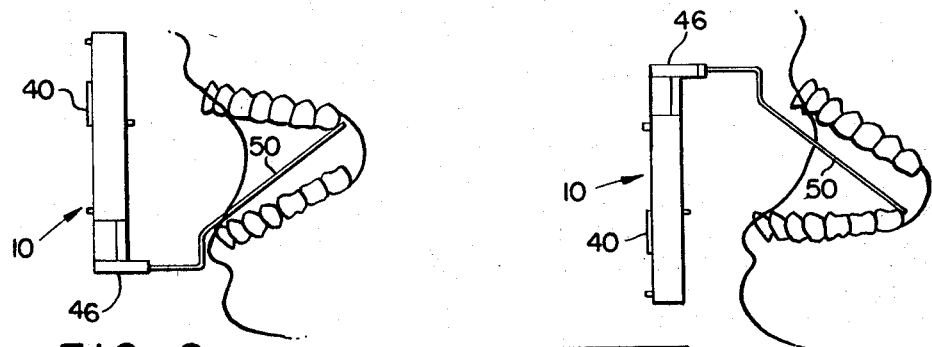
FIG. 2
FIG. 3
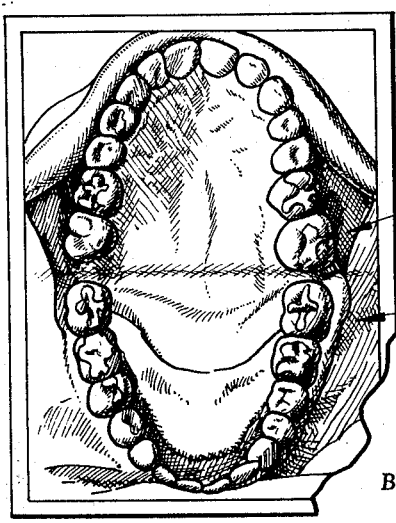
FIG. 4
INVENTOR.
Robert T. Sullivan
BY Brown and Mikulka
ATTORNEYS June 18, 1968 R. T. SULLIVAN 3,388,645
PHOTOGRAPHIC DEVICE
Filed Dec. 30, 1965 2 Sheets-Sheet 2

INVENTOR.
Robert T. Sullivan
BY Brown and Mikulka
ATTORNEYS

United States Patent Office 3,388,645
Patented June 18, 1968

3,388,645
PHOTOGRAPHIC DEVICE
Robert T. Sullivan, Norwood, Mass., assignor to Polaroid Corporation, Cambridge, Mass., a corporation of Delaware
Filed Dec. 30, 1965, Ser. No. 517,541
5 Claims. (Cl. 95—11)

This invention relates to intra-oral photography and particularly to a reflective device for facilitating the rapid photographing and reproduction in compact print form of both the upper and lower teeth of a human being, primarily for recording and identification purposes.

Photographic records of the teeth have long been employed for an identification purpose, usually to supplement the better-known and more-widely-used finger-print identification system. Their use in this capacity has principally been related to the recording of data for the armed services but is not limited thereto. The intra-oral records usually include a maxillary (upper jaw) view and a mandibular (lower jaw) view in the form of individual separate prints. The reflective device of the present invention makes possible the incorporation of both views in a single print.

The photographic device of the present invention is intended for use as a dental adjunct or accessory with a so-called "close-up" or short-range camera known as the "CU-5 Camera," sold by Polaroid Corporation, Cambridge, Mass., U.S.A., and described in detail in the co-pending U.S. patent application Ser. No. 422,149, now Patent No. 3,330,193, filed Dec. 20, 1964. This camera embodies the well-known self-processing features associated with cameras manufactured by Polaroid Corporation, whereby a finished print is produced within a matter of a few seconds following the photographic exposure. The camera also possesses certain features relating to interchangeable lenses and housing extensions or ratio multipliers which permit a variety of image sizes, reduce the need of making exposure computations and substantially eliminate focusing procedures. The aforesaid camera includes a built-in electronic-flash ring-light surrounding the lens aperture. It is adapted to use either black-and-white or color film as, for example, a "Type 107" black-and-white film assembly or a "Type 108" color film assembly, both sold by Polaroid Corporation. Each print-carrying area of the film assembly is of a rectangular shape measuring approximately 3¼ x 4¼ inches. The aforesaid film assemblies are supplied in the form of a film pack and incorporate a releasably-contained processing liquid which is released, after the photographic exposure, by processing means of the camera and spread throughout the exposed silver halide emulsion, the print being formed by a diffusion transfer process involving imbibition of the liquid.

Objects of the present invention are to provide a reflective device adapted to use with a given type of short-range camera and film material employed therewith for producing both a maxillary and a mandibular intra-oral view of a human subject on a single area of the film material; to provide a device of the character described which makes possible the recording of a plurality of intra-oral views more rapidly and in a more compact form than has heretofore been possible; to provide a device of the type stated which is adapted to be releasably mounted on the front of a camera having a ring-light encircling the lens aperture thereof and which includes means forming an aperture permitting the ring-light to illuminate intra-oral areas of the photographic subject; to provide a device of the aforementioned category which includes, respectively, an opaque portion adapted to cover a first area of the lens aperture, means in part surrounding the opaque portion forming an aperture for freely transmitting light rays from a circular ring-like source of illumination, and means providing a further aperture for permitting light from the photographic subject to enter a second area of the lens aperture for selective exposure of a film assembly; to provide a device as set forth which is adapted to be releasably mounted on a camera, optionally, at either of two positions identified with maxillary and mandibular areas of the inner mouth of the photographic subject; and to provide a device of the character described which is capable of being rotated to either of the aforesaid two positions while mounted on a camera and to be releasably held at these positions by detent means.

Other objects of the invention will in part be obvious and will in part appear hereinafter.

The invention accordingly comprises the apparatus possessing the construction, combination of elements and arrangement of parts which are exemplified in the following detailed disclosure, and the scope of application of which will be indicated in the claims.

For a fuller understanding of the nature and objects of the invention, reference should be had to the following detailed description taken in connection with the accompanying drawings wherein:

FIGURE 1 is a diagrammatic plan view of the reflective device of the present invention in association with a camera with which it is adapted to be employed;

FIGS. 2 and 3 are diagrammatic side views of the device of the invention illustrating intra-oral positions thereof during photography of maxillary and mandibular areas, respectively, of the subject;

FIG. 4 is a reproduction of two intra-oral picture areas obtained photographically by a camera, in conjunction with the device of the invention when positioned as shown in FIGS. 2 and 3. It is to be noted that the two picture areas are included within the area of a single sheet of positive-print material.

Figure 6:
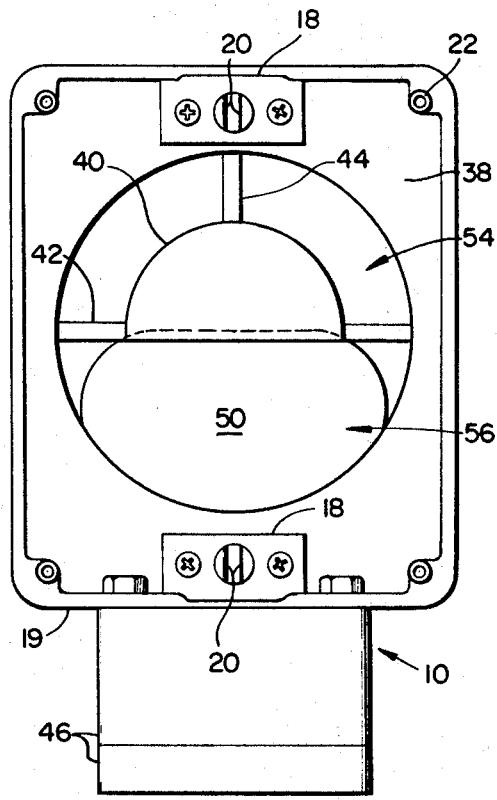

Referring now to FIGURE 1, the reflective device 10 of the present invention is shown in readiness for attachment to a short-range camera 12 with which it is to be employed by moving it, as illustrated, in a direction to the right. Attachment of the device to the camera is obtained by insertion of a pair of jacks 14, which project forwardly from the rectangular front face of the camera at each side of an annular ring-light housing 16, into the two sockets 18. The jacks 14 and sockets 18 thus constitute complementary engaging means. The sockets are located at the rear surface of the rectangular frame portion 19, adjacent to top and bottom edges thereof and include resilient engaging finger members 20, more clearly shown in FIG. 6. The frame 10, preferably composed of a metal such as aluminum, is held firmly mounted by the positioning lugs 22 which are inserted in the apertures 24.

The camera 12, when employed with the device 10, and contrary to its customary position during other photographic uses, is positioned on its side, as illustrated in FIGURE 1, so that the shutter release 26 and removable pistol grip 28 extend laterally from the camera housing. This is for the purpose of correctly interrelating the combined dimensions of the maxillary and mandibular intra-oral areas of the photographic subject with the long dimension of each film assembly contained in the camera back 12a. The long dimension of the latter is therefore to be assumed as extending in a direction normal to the plane of the paper. Thus, what is normally one side of the camera may be considered as the top thereof in the case of the subject usage. The terms "top" and "bottom"

or "upwardly" and "downwardly," are to be construed with reference to the camera 12 and device 10 positioned as shown and described with respect to FIGURE 1. The terms "front" and "rear," "forwardly" and "rearwardly," etc. are to be understood in the sense of their relative proximity to or remoteness from the photographic subject.

For purposes of the present invention, the camera may be assumed as composed of two separable rectangular sections, namely, a rear section or hollow chamber 12b, integral with the aforesaid back 12a, and a front section 12c housing lens and shutter means of the camera. The back 12a contains the film pack, provides a focal plane for the foremost film assembly and houses a compressive mechanism for processing each film assembly after its photographic exposure. The camera sections 12b and 12c are releasably held together by internal latching means which permit the introduction of an additional section or ratio multiplier therebetween for providing magnification of the subject. Release of the locked sections is effected by turning the knob 30. Completing a general description of the camera, a ring-type gaseous flash tube is shown at 32 and diaphragm adjusting means is indicated at 34. The electronic flash ring-light 32 is mounted in the annular housing 16, the latter including a reflector 11 and a light-transmitting protective plate 17. The diaphragm adjusting means 34 is of a type providing a rapid setting of the diaphragm aperture to three positions consistent with a given level of illumination and the different speed characteristics of black-and-white and color film, a constant shutter speed of 1/60 second being that generally employed for either type of film during semi-automatic operation. The shutter adjusting means 34 is more specifically described in the aforementioned copending U.S. patent application Ser. No. 422,149. The recessed plug 36 is adapted to receive the socket of a cable from an AC power pack for energizing the electronic flash lamp 32.

As employed in the present instance, the camera is limited to the assemblage of two sections, as shown. Assuming a 3-inch lens assembly to be contained within the front section 12c; a given distance to exist between the lens and photographic subject, for example, a distance of approximately 6 inches as provided by the device 10; and a given distance to obtain from lens-to-focal plane provided by the sections 12b and 12c, e.g., one of 6 inches, an approximately 1:1 or life-size subject-image ratio is produced. More specifically, the lens may be an f/4.5 to f/45 lens of 75 mm. (3-inch) focal length. Alternatively, the lens and distances above-given may be modified to provide various magnifications of the photographic subject, e.g., a .75:1 or a .85:1 ratio. No viewfinder is included or necessary for performing the intra-oral photography contemplated.

The reflective device 10, in addition to means for attaching it to the camera, previously described, includes a frontal substantially planar face-plate 38, preferably composed of a metal such as aluminum and integral with the frame 19; a circular aperture 39 formed in the plate 38 for accepting the ring-light housing 16; a partial or semi-circular opaque light-shielding member 40, mounted on the faceplate 38 by the horizontal and vertical support members 42 and 44, respectively; an angular appendage or mounting bracket 46 rigidly attached to and projecting downwardly and forwardly from the frame 10; means forming a slot 48 in the forward surface of the bracket 46; and a shaped metallic mirror or reflector 50 having an integral angular extension 50a slidably and releasably mounted within the slot 48. The extension 50a includes a formed keying portion 50b to insure its correct insertion in the slot. The reflector, of a flared contour and having a curved tip, extends at a given acute angle relative to the optical axis of the camera as, for example, at an angle of 45°.

Figure 5:
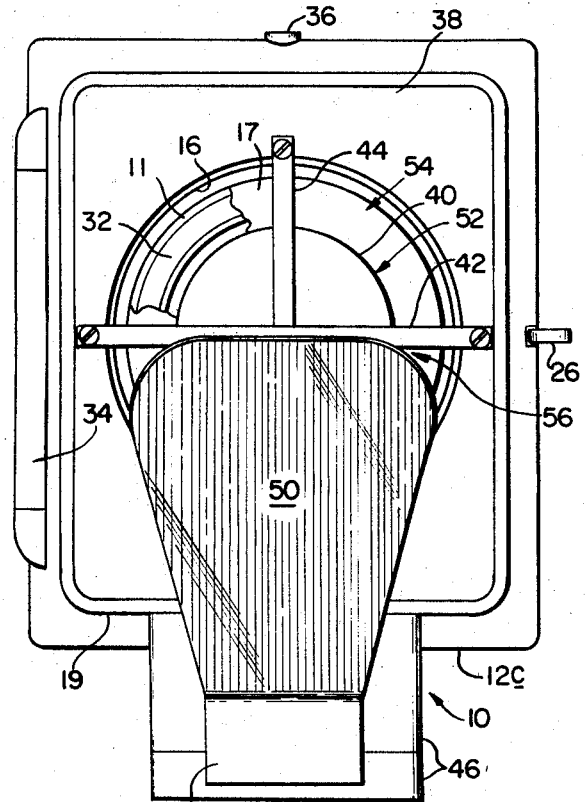
FIGS. 5 and 6 are diagrammatic front and rear views, respectively, of the device of the present invention.

When the reflective device 10 is mounted on the camera, as shown in FIG. 5, the shield 40 covers one-half of the lens aperture at 52 and light from the electronic flash ring-light 32 is transmitted forwardly, without obstruction, through the annular aperture 54 existing between the opaque shield 40 and the frontal plate 38. It is also transmitted in a similar direction through the semi-circular aperture 56. The mirror 50 both reflects the forwardly projected light rays to illuminate the intra-oral area to be photographed and reflects the area itself so that it is rendered "visible" for picture taking, through the uncovered aperture 56, to the camera lens and photosensitive emulsion of a foremost film assembly of the film pack, mounted within the camera.

The reflective device 10 is adapted to be mounted on the camera at either of two positions which are subject to rapid interchange, namely, so that the reflector projects angularly either in an upward or a downward direction. This is achieved by merely turning the device 180°, the sockets 18 being located along a center line at diametrically opposite locations for receiving the jacks or plugs 14 at either position. The two positions of the reflective device 10 are illustrated in FIGS. 2 and 3. In FIG. 2 a palatal and maxillary occlusal view is provided. In FIG. 3 a mandibular occlusal view is obtained. Assuming the two photographic exposures to be performed in rapid sequence, merely by rotating the device 180° and operating the exposure and processing means of the camera, a finished photographic print 58 of the type illustrated in FIG. 4 is obtained within a few seconds. Area 60 represents the maxillary portion and area 62 the mandibular portion of the photographic subject.

Figure 7:
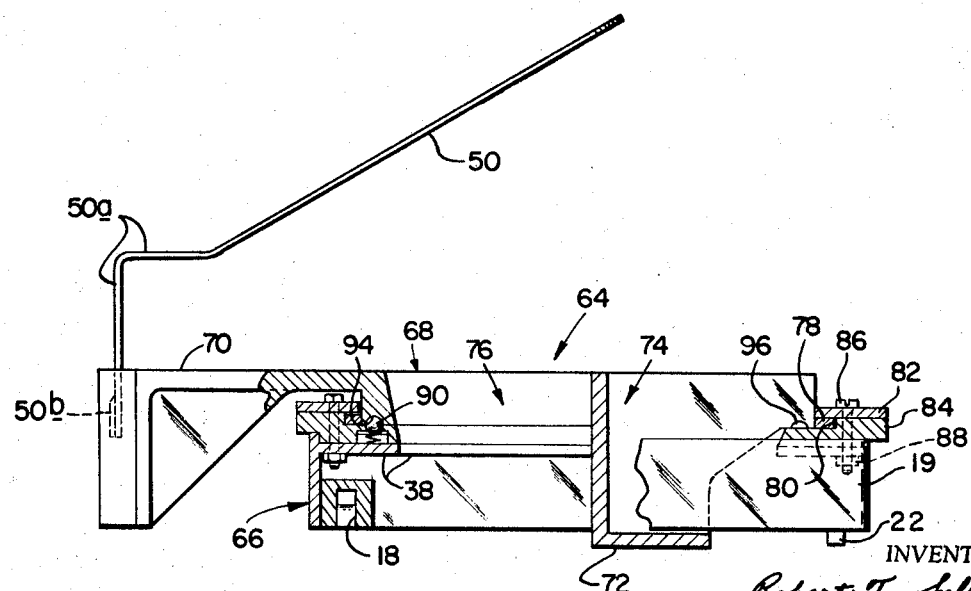
FIG. 7 is a diagrammatic side view, partly in cross-section, of a modification of the device of the invention which is adapted to be rotated to two positions while mounted on a camera.

A modification of the device which obviates the need of removing it from the camera and remounting it to obtain the two positions shown in FIGS. 2 and 3 is illustrated by the assembly 64 of FIG. 7. It includes a frame-like element 66 generally similar to that provided by the portions 18, 19, 22 and 38 of the device 10, previously described, but excluuding the shield 40 and bracket 46 which are somewhat altered in form in the modified structure. The element 66 is adapted to be fixedly mounted on the camera by insertion of the jacks 14 in the sockets 18. A second frame-like element 68, including a laterally-extending appendage or bracket 70 for relasably mounting the reflector 50, and an opaque shield 72 for covering one-half of the lens aperture of the camera in the manner of the shield 40, previously described, is mounted for rotation on the fixed element 6. The element 68 includes annular and semi-circular apertured portions 74 and 76 for illumination purposes and reflection of image-forming light rays from the photographic subject and mirror 50. It also includes an annular flange 78 positioned for rotational movement within a circular slot 80, the latter being provided by the two ring-like adapters 82 and 84. The superimposed adapters 82 and 84 are fastened to the fixed element 66 by the bolts 86 and nuts 88. The rotatable element 68 may be established at either of two positions 180° apart, providing alternate positions of the reflector 50 corresponding to those shown in FIGS. 2 and 3, by detent means consisting of the ball 90 which is biased by the spring 92 to enter either of the circular depressions 94 or 96 formed in the element 68. Rotation of the element 68 and reflector 50 mounted thereon is effected by manually rotating the bracket portion 70. This is accompanied by an alternate blocking of each half of the lens aperture by the opaque shield 72 while the other half is uncovered for performing a photographic exposure. In this manner a complete set of the maxillary and mandibular intra-oral areas is produced on a single sheet of film material.

Since certain changes may be made in the above apparatus without departing from the scope of the invention herein involved, it is intended that all matter contained in the above description or shown in the accompanying drawings shall be intrepreted as illustrative and not in a limiting sense.

What is claimed is:

1. A reflective device for dental usage when incorporated with a short-range camera enabling a rapid sequential photographing of both upper and lower human intra-oral areas by said camera so as to permit the reflection of both said upper and lower areas on a single sheet of photographic film carried by said camera, the camera embodying an electronic-flash ring-light generally surrounding its lens aperture, said device comprising a rigid plate-like supporting element, engaging means mounted on said plate-like element for releasably engaging complementary means of said camera to hold said device mounted on said camera, means forming a generally circular aperture in said plate-like element, an opaque semispherical light-shielding member of a relative size and so mounted within a given half of said circular aperture as to obstruct substantially one-half of the lens aperture of said camera when said device is mounted thereon and to provide an annular space between said light-shielding member and said given half of said circular aperture, whereby light rays from said ring-light are permitted to pass through said annular space and through the other half of said circular aperture which is unobstructed by said light-shielding member, and reflector means so attached to said plate-like element as to extend outwardly at an acute angle therefrom and to be optically aligned with at least said unobstructed half of said circular aperture, said reflector means serving both to reflect said light rays so as to illuminate said intra-oral areas and to reflect said intra-oral areas for photographic recording by said camera.

2. A device, as defined in claim 1, wherein said engaging means are so located on said plate-like element as to be interchangeably engageable to enable said device to be mounted, optionally, on said camera at either of two rotational positions approximately 180° apart, whereby said reflector means may be positioned for reflecting said upper and said lower intra-oral areas in rapid succession.

3. A device, as defined in claim 1, wherein said reflector means extends at an angle of approximately 45° with respect to the optical axis of said camera.

4. A device, as defined in claim 1, wherein means carrying said reflector means is rotatably mounted relative to said plate-like supporting element, whereby said reflector means may be rotated, optionally, to either of two locations approximately 180° apart.

5. A device, as defined in claim 4, wherein detent means are provided to establish said two locations.

References Cited

UNITED STATES PATENTS

| 445,561 | 2/1891 | Knox | 95—36 |
| 2,072,390 | 3/1937 | Hartingsvelt. | |
| 3,330,193 | 7/1967 | Kaess | 95—11 |

NORTON ANSHER, *Primary Examiner.*

F. L. BRAUN, *Assistant Examiner.*